United States Patent
Ellis et al.

(10) Patent No.: US 7,422,679 B2
(45) Date of Patent: Sep. 9, 2008

(54) LOW CO FOR INCREASED NAPHTHA DESULFURIZATION

(75) Inventors: Edward S. Ellis, Falls Church, VA (US); Thomas R. Halbert, Baton Rouge, LA (US); Garland B. Brignac, Clinton, LA (US); John P. Greeley, Annandale, NJ (US); Richard A. Demmin, Highland Park, NJ (US); Theresa A. Lalain, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 412 days.

(21) Appl. No.: 10/427,480

(22) Filed: May 1, 2003

(65) Prior Publication Data
US 2003/0221994 A1   Dec. 4, 2003

Related U.S. Application Data

(60) Provisional application No. 60/383,638, filed on May 28, 2002.

(51) Int. Cl.
*C10G 45/04* (2006.01)
(52) U.S. Cl. .................. 208/217; 208/216 R; 208/213; 208/209
(58) Field of Classification Search .............. 208/217, 208/216 R, 213, 209
See application file for complete search history.

(56) References Cited

U.S. PATENT DOCUMENTS

| | | | | |
|---|---|---|---|---|
| 3,551,124 | A | 12/1970 | Iwaki et al. | 48/214 |
| 3,660,276 | A | 5/1972 | Lacey | 208/212 |
| 4,300,999 | A * | 11/1981 | Davies et al. | 208/212 |
| 4,457,834 | A * | 7/1984 | Caspers et al. | 208/143 |
| 5,286,373 | A | 2/1994 | Sudhakar et al. | 208/216 R |
| 5,423,975 | A | 6/1995 | Sudhakar et al. | 208/216 R |
| 5,525,211 | A | 6/1996 | Sudhakar et al. | 208/217 |
| 5,985,136 | A | 11/1999 | Brignac et al. | 208/216 |
| 6,190,540 | B1 | 2/2001 | Lokhandwala et al. | 208/209 |
| 6,231,754 | B1 | 5/2001 | Brignac et al. | 208/217 |

FOREIGN PATENT DOCUMENTS

GB     1028245     5/1966

OTHER PUBLICATIONS

S.J. Tauster, et al., "Structure and Properties of Molybdenum Sulfide: Correlation of $O_2$ Chemisorption with Hydrodesulfurization Activity," Catalysis, 63, pp. 515-519 (1980).

* cited by examiner

*Primary Examiner*—Tam M. Nguyen
(74) *Attorney, Agent, or Firm*—Lawrence E. Carter; James H. Takemoto

(57) ABSTRACT

Naphtha hydrodesulfurization selectivity is increased by reducing the amount of $CO_X$ (CO plus ½ $CO_2$) in the hydrodesulfurization reaction zone to less than 100 vppm. While this is useful for non-selective hydrodesulfurization, it is particularly useful for selectively desulfurizing an olefin-containing naphtha without octane loss due to olefin saturation by hydrogenation. The $CO_X$ reduction is achieved by removing $CO_X$ from the treat gas before it is passed into the reaction zone.

23 Claims, 4 Drawing Sheets

LOW CO FOR INCREASED NAPHTHA DESULFURIZATION

CROSS REFERENCE TO RELATED APPLICATION

This application claims benefit of U.S. Provisional Patent Application 60/383,638 filed May 28, 2002.

FIELD OF THE INVENTION

The invention relates to reducing the amount of $CO_X$ present during naphtha hydrodesulfurization. More particularly the invention relates to increasing naphtha hydrodesulfurization selectivity, for increased naphtha desulfurization while maintaining octane number, by reducing the amount of $CO_X$ in the hydrogen treat gas to a level of less than 100 vppm, on a combined gas and naphtha vapor basis.

BACKGROUND OF THE INVENTION

Low sulfur motor gasoline (low sulfur "mogas") requires the production of low sulfur blend stocks for the mogas pool. A primary blend stock is derived from catalytically cracked (e.g., FCC) naphthas which, in addition to unwanted organic sulfur compounds, contain olefins desirable for meeting octane number rating requirements. Sulfur must be removed to meet environmental requirements. It is frequently beneficial to distinguish two different types of naphtha hydrodesulfurization processes, selective and non-selective. In selective naphtha hydrodesulfurization, it is desired to remove as much sulfur as possible, while preserving olefins. In hydrotreating or non-selective hydrodesulfurization, heteroatom removal is the primary goal, with olefin preservation being a secondary concern. In non-selective hydrodesulfurization, sulfur removal is increased by increasing the process severity and/or changing or increasing the amount of catalyst. However, increasing the severity of the reaction conditions for sulfur removal in a selective naphtha hydrodesulfurization process results in a loss in octane rating, due to olefin saturation by hydrogenation.

In hydrodesulfurization, naphtha is reacted with a hydrogen-containing treat gas over a sulfided hydrodesulfurization catalyst, which forms $H_2S$ and a sulfur-reduced naphtha. Such catalysts are known and typically contain at least one catalytic component of a metal of Group VI or a non-noble metal of Group VIII, and more often a catalytic component of both a Group VI metal and a Group VIII non-noble metal. In addition to having catalytic activity for removing sulfur and other heteroatoms, these naphtha hydrodesulfurization catalysts have hydrogenation activity, which saturates some of the desirable olefins. Such processes are disclosed, for example, in U.S. Pat. Nos. 5,286,373; 5,525,211; 5,423,975, 5,985,136 and 6,231,754. The hydrogen-containing treat gas for the hydrodesulfurization is obtained from a variety of sources, such as continuous regeneration naphtha reformers, steam-methane reformers, natural gas-hydrogen blends, pipeline hydrogen, steam cracker by-product gas, hydrogen recovered from refinery fuel gas streams and the like. Some such steams can contain from 100-2,000 or more vppm $CO_X$. Because the process variables noted above are adjusted to achieve the desired level of sulfur removal in non-selective naphtha hydrodesulfurization, the presence of $CO_X$ levels on the order of 100-200 vppm in the treat gas has typically been ignored and, as a consequence, this has also not been considered important in selective hydrodesulfurization.

SUMMARY OF THE INVENTION

In an embodiment, the invention relates to catalytically hydrodesulfurizing a sulfur-containing naphtha with a hydrogen treat gas, in a hydrodesulfurization reaction zone in which less than 100 vppm, preferably less than 30 vppm, more preferably less than 15 vppm and still more preferably less than 5 vppm $CO_X$ is present, based on the total amount of gas and vapor in the zone. By $CO_X$ is meant CO plus one half the amount of any $CO_2$ present (e.g., vppm $CO_X$=vppm CO+½ vppm $CO_2$). By total gas and vapor is meant that the $CO_X$ content is based on the concentration of $CO_X$ in the combined total of (i) the hydrogen treat gas and (ii) the naphtha feed in the vapor state during the hydrodesulfurization. By hydrogen treat gas is meant a gas comprising hydrogen for the hydrodesulfurization reaction. It has been found that reducing the $CO_X$ in the hydrodesulfurization reaction zone below 100 vppm, on a total gas and vapor basis, increases the amount of sulfur removed from the naphtha. For either non-selective or selective hydrodesulfurization, this means increasing the amount of sulfur removed from the naphtha, without having to increase the amount of catalyst in the reactor or the severity of the hydrodesulfurizing reaction conditions. The invention is particularly useful for selectively hydrodesulfurizing an olefin and sulfur-containing naphtha, because it has been found that sulfur removal from the naphtha is increased without significant olefin loss due to saturation by hydrogenation. Thus, the selectivity for sulfur removal is increased without losing olefins desirable for meeting octane requirements. With respect to non-selective and selective naphtha desulfurization, those skilled in the art know that the two processes are not equivalent, in that the naphtha feed, catalysts and reaction conditions are typically different.

The $CO_X$ primarily comes from the hydrogen treat gas, all or a portion of which may be derived from a $CO_X$-containing source of hydrogen. Therefore, in one embodiment the treat gas, or only that portion obtained from a source containing $CO_X$, is switched over to a source that contains less or no $CO_X$, so that the amount of $CO_X$ in the treat gas entering the reaction zone is low enough to insure that less than 100 vpm, preferably less than 30 vppm, more preferably less than 15 vppm and still more preferably less than 5 vppm $CO_X$ is present during hydrodesulfurization. In another embodiment of the invention, which is more typical and is preferred, the $CO_X$ content of all or a portion of the treat gas is reduced before the gas is passed into the hydrodesulfurization reaction zone, to provide a $CO_X$ level in the zone of less than 100 vppm on the combined gas and vapor basis. In either embodiment, the $CO_X$ content of the treat gas is reduced before it is passed into the reaction zone.

The $CO_X$ may also be carried into the hydrodesulfurization reaction zone with the naphtha feed as dissolved or entrained gas. In such cases, the $CO_X$ may become mixed with the naphtha in upstream equipment such as feed surge drums, where $CO_X$-containing gas may be used to blanket the liquid feed. In another embodiment, $CO_X$-containing gasses, which come into contact with the liquid feed upstream of the point at which treat gas is mixed with the feed, are replaced with non-$CO_X$-containing gasses.

The naphtha hydrodesulfurization process of the invention comprises reacting a sulfur-containing naphtha with a hydrogen treat gas, in the presence of a hydrodesulfurization catalyst, in a hydrodesulfurization reaction zone in which the amount of $CO_X$ present, on a combined gas and naphtha vapor basis, is maintained at less than 100 vppm. In one embodiment the invention relates to a naphtha hydrodesulfurization process, which comprises passing a sulfur-containing naphtha and a hydrogen treat gas into a reaction zone, in which the hydrogen and naphtha react in the presence of a hydrodesulfurization catalyst, to remove sulfur from the naphtha and form a sulfur-reduced naphtha, wherein all or a portion of the treat gas contains $CO_X$ and wherein, before the treat gas is passed into the reaction zone, the $CO_X$ content is reduced to a level to insure that less than 100 vppm is present in the reaction zone, based on the combined volume of treat gas and naphtha vapor in the zone. In another embodiment the process selectively removes sulfur from an olefin and sulfur-containing naphtha. In yet another embodiment of a selective naphtha hydrodesulfurization process, naphtha product octane number is adjusted in a target range substantially the same as or only slightly less than the feed octane number (e.g. within about five and preferably two road octane numbers of the feed's road octane number), by regulating $CO_x$ content of the treat gas in a range of from about 0 to about 100 vppm. In still another embodiment, the invention relates to increasing either or both the amount of sulfur being removed or the naphtha feed capacity of a naphtha hydrodesulfurization process, in which a sulfur-containing naphtha and a hydrogen treat gas are passed into a reaction zone, in which the naphtha and hydrogen in the gas react in the presence of a naphtha hydrodesulfurization catalyst, wherein the treat gas contains $CO_X$ in an amount such that at least 100 vppm is present in the reaction zone, based on volume of treat gas and naphtha vapor in the zone, and wherein the increase is achieved by reducing the amount of $CO_X$ in the gas to a level such that less than 100 vppm is present in the reaction zone.

In a preferred embodiment, the naphtha contains both olefins and sulfur and, in addition to increasing either or both the amount of sulfur being removed or the naphtha feed capacity, the selectivity for sulfur removal is increased. In these and related embodiments, a naphtha is catalytically hydrodesulfurized in one or more reaction zones, and the hydrodesulfurization is preferably conducted in the vapor phase, although mixed vapor-phase liquid-phase reactions can also be employed. Therefore, while the naphtha feed being passed into the reaction zone may be vapor, mixed liquid and vapor or all liquid, the $CO_X$ limit is determined or calculated on the basis of the amount of treat gas and naphtha vapor present during the hydrodesulfurization.

Reducing the amount of $CO_X$ in the desulfurizing reaction zone is achieved by one or more of (i) removing $CO_X$ from fresh treat gas used as make-up, (ii) removing $CO_X$ from recycle treat gas, (iii) purging a portion of the recycle treat gas, and (iv) eliminating or reducing $CO_X$ from gasses blanketing or contacting the feed naphtha prior to the point at which treat gas is mixed with the naphtha. If purging is employed, it is preferred that it be combined with removing $CO_x$ from the fresh or make-up hydrogen. In the case of a once-through hydrogen treat gas process with no recycle, the $CO_X$ in the once-through gas is reduced before the gas passes into the reaction zone. As is mentioned above, $CO_X$ reduction is achieved either by removing $CO_X$ from a gas comprising hydrogen, that forms all or part of the treat gas, or by switching over to a hydrogen-containing gas having less or no $CO_X$, that has not been treated specifically for $CO_X$ removal. $CO_X$ removal is achieved by any suitable means and is discussed in detail below. $CO_x$ can enter the process from any of several sources, including, by way of example, from fresh make-up hydrogen, from the naphtha feed, and from lean amine when an amine scrubber is employed for $CO_X$ removal.

DETAILED DESCRIPTION

Figure 1:
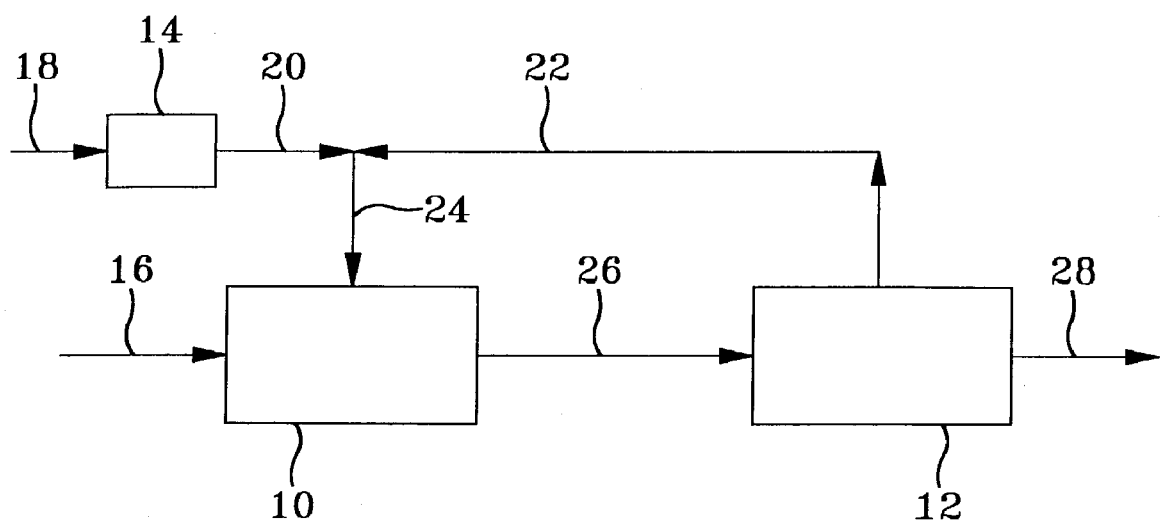
FIG. 1 is a simple block flow diagram of a hydrodesulfurization process of the invention in which $CO_X$ is removed from make-up hydrogen.

The $CO_X$ reduction greatly increases naphtha hydrodesulfurization activity, with essentially no effect on olefin saturation. This therefore makes the catalyst highly selective for removing sulfur from naphthas that contain both sulfur and olefins. The invention is useful in processes that use (i) $CO_X$-containing fresh hydrogen treat gas used for make-up hydrogen, (ii) a $CO_X$-containing naphtha feed and (iii) both (i) and (ii). Fresh hydrogen treat gas is meant to include make-up hydrogen and once-through hydrogen, and excludes recycled hydrogen. The naphtha feed contains organic sulfur compounds which react with the hydrogen in the treat gas, in the presence of the catalyst, to produce a sulfur-reduced naphtha, and a gas containing $H_2S$ and unreacted hydrogen. In a preferred embodiment, this gas is separated from the sulfur-reduced naphtha. Unless the naphtha feed is very low in sulfur (e.g., less than about 200-300 wppm), the $H_2S$ is typically separated from the hydrogen-containing gas before the hydrogen-containing treat gas is recycled back into the desulfurization-reactor. It is known that, when desulfurizing distillate fuel fractions, such as diesel fractions, and heavier fractions, $CO_X$ tends to inhibit hydrodesulfurization over catalysts comprising one or more supported metal catalytic components of metals of Group VIB and Group VIII, such as cobalt and molybdenum. The general effect is that the catalytic hydrodesulfurization reaction activity is suppressed in the presence of $CO_X$ until the $CO_X$ is removed. Removing the $CO_X$ results in a restoration of the desulfurization activity.

It is also known, for example, that when desulfurizing distillate fractions under conventional, non-selective hydrodesulfurization conditions, from 0.2 to 5 mole % $CO_X$ (2,000 to 50,000 vppm) can reduce desulfurization activity by about 10% to 40%, but when the $CO_X$ is less than about 200 vppm, catalyst type, catalyst amount, and the severity of process conditions can be regulated to avoid an activity loss. It was not known and was therefore unexpected to find that very low levels of $CO_X$ (e.g., less than 100 vppm) produce significant catalytic activity suppression (e.g., less than or equal to 10-40%) during naphtha desulfurization. Consequently, the conventional practice of regulating catalyst type, catalyst amount, and process severity in order to restore or preserve hydrodesulfurization activity can now be simplified in processes where the treat gas contains undesirably high levels of $CO_x$ (i.e., more than about 100 vppm). Catalytic activity for hydrodesulfurization can be restored or preserved in such processes by regulating the level of $CO_X$ in the treat gas in the range of about 0 vppm to about 100 vppm without the need to substantially change catalyst type, amount, or process severity.

The benefit of regulating the level of $CO_x$ is even greater in selective hydrodesulfurization processes. In selective hydrodesulfurization, catalyst, type, amount, and process conditions are selected to reduce feed sulfur levels while preserving as much as possible the feed olefin content, and, hence, the feed octane number. It has now been found, for example, that when selectively hydrodesulfurizing a sulfur and olefin-containing naphtha, about 4 vppm $CO_X$ produced a 10% loss, 6 vppm resulted in a 15% loss, while 70 vppm produced a 50% activity loss. Therefore, the $CO_X$ must be regulated at extremely low levels to preserve or restore activity while selectively hydrodesulfurizing naphtha. This approach is to be distinguished from the conventional practice of regulating catalyst type, catalyst amount, and the severity of the selective hydrodesulfurization conditions. The conventional approach leads to a trade-off between desulfurization and olefin preservation (octane number retention) that is avoided by the new process of the invention.

Any method for removing $CO_X$ can be used including, but not limited to, one or more of a methanation reactor, a water gas shift reactor, pressure swing absorption (PSA), thermal swing absorption (TSA), membrane separation, purging the recycle gas and the like. These methods are all known. In methanation, the $CO_X$ and $H_2$ in the gas react in the presence of a catalyst, such as nickel on alumina, to produce $CH_4$ and $H_2O$. In a water gas shift reaction, the treat gas and water vapor are passed into a reactor containing a shift catalyst, at reaction conditions effective for the CO in the gas to react with the water vapor to form $CO_2$ and $H_2$. The $CO_2$ in the gas exiting the shift reactor is then removed by any means, such as amine scrubbing. The shift reaction catalyst comprises a Group VIII metal, as in nickel, on a support component. PSA and TSA are both adsorption-desorption processes which comprise a plurality of adsorbent containing vessels operated in a cyclic manner. Adsorbents include molecular sieves, silica gel and activated carbon. The difference between PSA and TSA, is that the $CO_X$ which is primarily adsorbed by the adsorbent during the adsorption part of the cycle is desorbed from the adsorbent during regeneration by a pressure swing cycle in PSA, as opposed to a thermal swing cycle in TSA. A typical PSA or TSA unit has at least one vessel on adsorption, while at least one other vessel is being depressurized or heated up, and purged, with yet at least one other vessel being repressurized or cooled down. In membrane separation, bundles of hollow fibers are present in the vessel. The gas is passed into the vessel in which it flows over the outside of the fibers and out of the vessel. A hydrogen rich and $CO_X$-reduced gas forms inside each fiber and is removed as a separate, permeate stream. In a typical installation a plurality of such vessels are connected in series, with the permeate from each vessel being the feed into the next successive vessel. A combination of PSA or TSA adsorption-desorption and membrane separation may be used, with the gas first passed through a membrane unit and then through a PSA or TSA unit, to further reduce the $CO_X$ content. Increasing the recycle gas purge increases the amount of make-up hydrogen and is impractical at relatively high (e.g., $\geqq 40$ vppm) $CO_X$ levels.

When conventional, non-selective hydrodesulfurization is employed, the naphtha feed to be desulfurized contains sulfur but may or may not contain olefins. For example, straight-run naphtha, catalytically cracked naphtha, and mixtures thereof. When selective hydrodesulfurization is employed, the naphtha will generally contain both sulfur and olefins. Suitable naphtha feeds for selective hydrodesulfurization comprise hydrocarbons boiling in the naphtha boiling range containing olefins and sulfur. Such naphthas include one or more of, for example, a distillate naphtha, a cracked naphtha, a cat cracked naphtha such as a fluid cat cracked (FCC) naphtha, steam cracked naphtha, coker naphtha, visbreaker naphtha, thermal cracker naphtha and the like and may be derived from petroleum, coke or coal, shale oil, bitumen, Fischer-Tropsh synthesized hydrocarbons and the like. The naphtha may be a full range wide-cut, light, intermediate cut, a heavy cut, a light cut and blends and fractions thereof, with end boiling points typically below 450° F., and which typically contain 60 vol. % or less olefinic hydrocarbons, with sulfur levels as high as 3000 wppm and even higher (e.g., 7,000 to 15,000 wppm). The naphtha feed, preferably a cracked naphtha feedstock, generally contains not only paraffins, naphthenes and aromatics, but also olefinic unsaturates, such as olefins, and aromatic and cyclic hydrocarbons with olefinic side chains. The olefin content of a typical cracked naphtha feed can broadly range from 5-60 vol. %, but more typically from 10-40 vol. %. The sulfur content of a naphtha typically less than 1.5 wt. %, typically ranging from as low as 0.005 wt. %, up to as much as about 0.7 wt. %, based on the total feed composition.

When non-selective hydrodesulfurization is employed, regulating the level of $CO_x$ in the reaction in the range of about 0 vppm to about 100 vppm results in the restoration or preservation of hydrodesulfurization activity without resorting to undesirable adjustments based on catalyst type, catalyst amount, and the relative severity of the process conditions. Non-selective hydrodesulfurization conditions broadly include temperatures and pressures of from about 375-750° F., 50-2,000 psig., a space velocity of about 0.1-10 LHSV, and a treat gas rate of about 100-10,000 SCF/B. When selective hydrodesulfurization is employed, the conditions according to the practice of the invention broadly include a temperature of about 390-750° F., a pressure of about 50-1,000 psig, a liquid hourly space velocity of about 0.1-10 LHSV, and a hydrogen or hydrogen-containing treat gas rate of about 100-10,000 SCF/B. Preferred conditions include about 470-750° F., about 75-600 psig, about 1-7 LHSV, and about 300-4,000 SCF/B. Still more preferred are about 470-650° F., about 100-500 psig, and about 500-3,000 SCF/B.

Catalysts used for desulfurizing naphtha and which are useful in the practice of the invention typically comprise a support component and at least one catalytic metal component of one or more metals of Group VIB, Group VIII and mixture thereof, and typically a mixture thereof. While one or more Group VIII noble metals may be employed, non-noble metals are more generally used for naphtha desulfurization. The catalyst may also include a component of one or more metals of Group IA, IIA and IB. The Groups referred to herein are those found in the Periodic Table of the Elements, copyrighted in 1968 by the Sargent-Welch Scientific Company. Such catalysts exhibit both hydrodesulfurization and hydrogenation activity. While hydrogenation activity is not desirable for hydrodesulfurizing an olefin-containing naphtha for mogas, due to olefin saturation and concomitant loss of octane, at least some hydrogenation activity is almost always inherent in a desulfurizing catalyst. The Group VIII catalytic metal component will comprise a non-noble or noble metal component and more typically a non-noble metal component. The Group VIII non-noble metal will be at least one of Co, Ni and Fe and more typically Co and/or Ni. A noble metal, if present, will be Pt, Pd or a mixture of Pt and Pd. The Group VIB metal will typically be one or more of Mo and W, more typically Mo. The total amount of Group VIII and/or Group VI metal, based on the weight of the metal oxide(s), will typically range from 0.5-30 wt. % of the total catalyst composite. Noble Group VIII metals are used in substantially less amounts than non-noble metal components, as is known. The amount of Group VIB metal may range from 5-50 and more typically 10-40 wt. % of the combined amount of both the Group VIII and VIB metals, based on the combined weight of the metal oxides. Non-noble Group VIII metals are preferred. Typical non-noble metal combinations include cobalt and molybdenum, nickel and molybdenum, and nickel and tungsten. Total catalytic metal loadings of Co and Mo of less than 12 wt. %, based on the weight of the Co and Mo as CoO and $MoO_3$, and a support component comprising at least one of alumina, silica and silica-alumina are preferred for selective naphtha desulfurization. The catalyst may be presulfided or it may be sulfided in-situ, using conventional sulfiding procedures. The catalyst will be sulfided prior to the treatment of the invention and to its use for sulfur removal.

When selective hydrodesulfurization is employed, a low metal loaded hydrodesulfurization catalyst comprising CoO and $MoO_3$ on a support and having a Co/Mo atomic ratio of from 0.1 to 1.0 is particularly preferred. By low metal loaded is meant that the catalyst will contain not more than 12, preferably not more than 10 and more preferably not more than 8 wt. % catalytic metal components calculated as their oxides, based on the total catalyst weight. Such catalysts include: (a) a $MoO_3$ concentration of about 1 to 10 wt. %, preferably 2 to 8 wt. %, and more preferably 4 to 6 wt. % of the total catalyst; (b) a CoO concentration of 0.1 to 5 wt. %, preferably 0.5 to 4 wt. %, and more preferably 1 to 3 wt. % based on the total catalyst weight. The catalyst will also have (i) a Co/Mo atomic ratio of 0.1 to 1.0, preferably 0.20 to 0.80 and more preferably 0.25 to 0.72; (ii) a median pore diameter of 60 to 200 Å, preferably from 75 to 175 Å, and more preferably 80 to 150 Å; (iii) a MoO surface concentration of $0.5 \times 10^{-4}$ to $3 \times 10^{-4}$ g. $MoO_3/m^2$, preferably $0.75 \times 10^{-4}$ to $2.4 \times 10^{-4}$, and more preferably $1 \times 10^{-4}$ to $2-10^{-4}$, and (iv) an average particle size diameter of less than 2.0 mm, preferably less than 1.6 mm, and more preferably less than 1.4 mm. The most preferred catalysts will also have a high degree of metal sulfide edge plane area as measured by the Oxygen Chemisorption Test described in "Structure and Properties of Molybdenum Sulfide: Correlation of $O_2$ Chemisorption with Hydrodesulfurization Activity," S. J. Tauster, et al., J of Catalysis, 63, p. 515-519 (1980), which is incorporated herein by reference. The Oxygen Chemisorption Test involves edge-plane area measurements made wherein pulses of oxygen are added to a carrier gas stream and thus rapidly traverse the catalyst bed. The metal sulfide edge plane area of the catalyst, as measured by the oxygen chemisorption, will be from about 761 to 2800, preferably from 1000 to 2200, and more preferably from 1200 to 2000 μmol oxygen/gram $MoO_3$. Alumina is a preferred support. The supported, low metal loaded Co and Mo containing catalyst used in the example and comparative examples below, met at least the broad ranges of all the catalyst parameters for the low metal loaded catalyst set forth in this paragraph. For catalysts with a high degree of metal sulfide edge plane area, magnesia can also be used. The catalyst support material will preferably contain less than 1 wt. % of contaminants such as Fe, sulfates, silica and various metal oxides which can be present during preparation of the catalyst. It is preferred that the catalyst be free of such contaminants. In one embodiment, the catalyst may also contain from up to about 5 wt. %, preferably 0.5 to 4 wt. %, and more preferably 1 to 3 wt. % of an additive in the support, which additive is selected from the group consisting of phosphorous and metals or metal oxides of metals.of Group IA (alkali metals).

The one or more catalytic metals can be deposited incorporated upon the support by any suitable conventional means, such as by impregnation employing heat-decomposable salts of the Group VIB and VIII metals or other methods known to those skilled in the art, such as ion-exchange, with impregnation methods being preferred. Suitable aqueous impregnation solutions include, but are not limited to a nitrate, ammoniated oxide, formate, acetate and the like. Impregnation of the catalytic metal hydrogenating components can be employed by incipient wetness, impregnation from aqueous or organic media, compositing. Impregnation as in incipient wetness, with or without drying and calcining after each impregnation is typically used. Calcination is generally achieved in air at temperatures of from about 500-1200° F., with temperatures from 800-1100° F. typical.

By treat gas is meant all hydrogen or a mixture of hydrogen and inert species which do not affect the treatment or sulfur removal processes, but serve merely as a diluent for the hydrogen, such as nitrogen, methane, ethane and the like. The amount of hydrogen in the gas will typically be at least 60 vol. % and preferably at least 75 vol. %. Recycle treat gas comprises the hydrogen rich gaseous reactor effluent separated from the desulfurized naphtha. Fresh hydrogen means hydrogen or a treat gas containing hydrogen, used to provide make-up hydrogen to the reactor.

Figure 2:
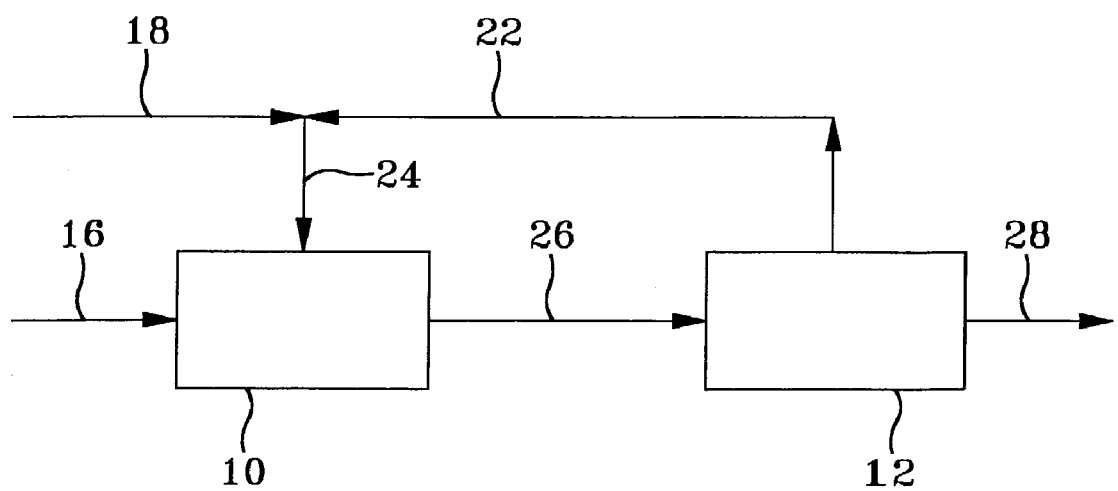
FIG. 2 is a simple block flow diagram of a prior art hydrodesulfurization process with no $CO_X$ removal.
Figure 3:
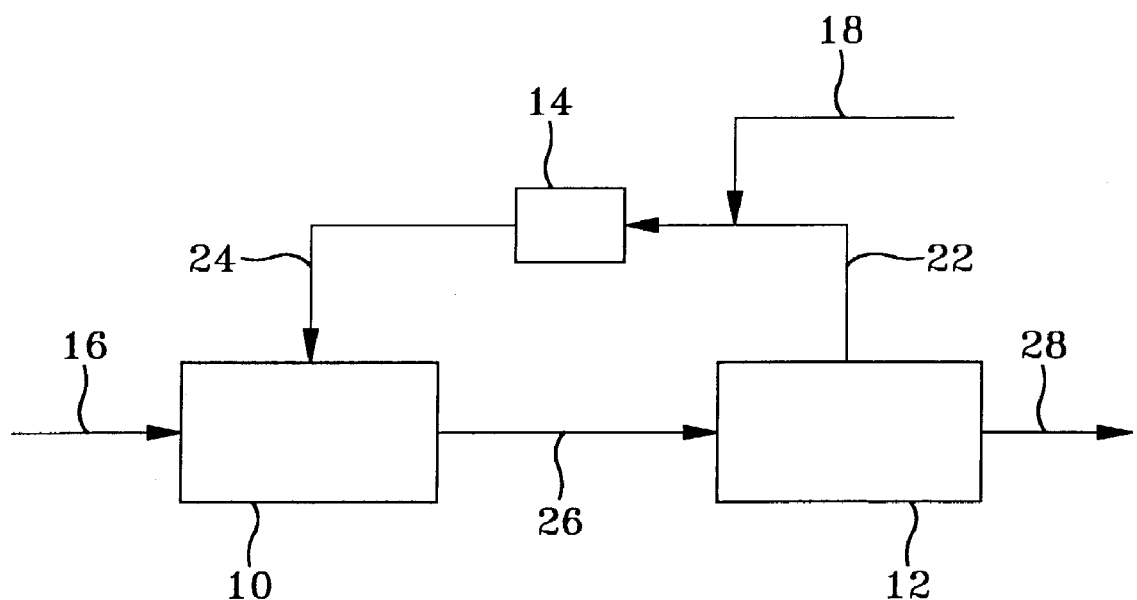
FIG. 3 is a simple block flow diagram of a hydrodesulfurizing process of the invention, with $CO_X$ removal from hydrogen treat gas.
Figure 4:
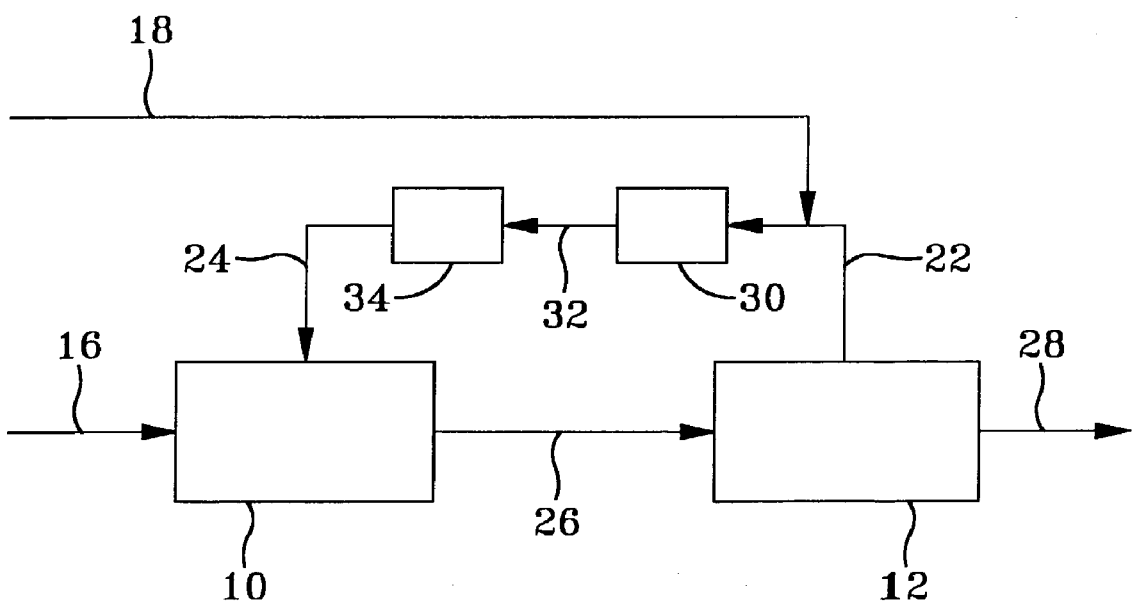
FIG. 4 shows a hydrodesulfurization process, in which the CO in the treat gas is converted to $CO_2$, followed by $CO_2$ removal.

The invention will be further understood with reference to FIGS. 1-4, of which FIGS. 1, 3 and 4 are simple block flow diagrams of three different embodiments of the process of the invention. FIG. 2 is a block flow diagram of a prior art hydrodesulfurization process, which does not include $CO_X$ removal. The practice of the invention however, is not intended to be limited to only these three illustrative embodiments or examples, nor is it intended to be limited to only single stage and fixed catalyst bed processes. It is also applicable to multi-stage processes, processes which include distillation (e.g., U.S. Pat. No. 6,303,020), moving bed processes, fluidized bed processes, once-through hydrogen treat gas processes in which there is no recycle of the hydrogen treat gas, etc. FIG. 1 is a simple block flow diagram of one embodiment of the process of the invention. In FIG. 1, a single stage hydrodesulfurization process is seen as including a hydrodesulfurization reactor 10, a separation unit 12 and a $CO_X$ removal unit 14. Reactor 12 contains at least one fixed bed of hydrodesulfurization catalyst (not shown). A naphtha feed containing both organic sulfur compounds and olefins is passed into the reactor. Fresh hydrogen treat gas, which serves as make-up hydrogen and which contains from about 10-20 vppm $CO_X$ is passed into $CO_X$ removal unit 14. For this illustration it is assumed that all the $CO_X$ is CO. Thus, the make-up hydrogen gas contains 10-20 vppm CO. Unit 14 is a simple methanater reactor, which reduces the CO content in the gas down to a level of less than 1 vppm, by converting it to methane and water vapor. The make-up treat gas, now containing less than 1 vppm CO, is passed into the hydrodesulfurization reactor 12 via lines 20 and 24. At the same time, recycle hydrogen treat gas from line 22 also passes into the reactor 12 via line 24. This recycle hydrogen treat gas contains less than 5 vppm of CO. As a consequence, the CO content of the combined fresh and recycle hydrogen treat gas streams entering reactor 12 via line 22 is less than 5 vppm. In this embodiment the reactor is operated under conditions for maximum hydrodesulfurization selectivity, to maximize sulfur removal with minimal hydrogenation of olefins. In the reactor, all the naphtha is vapor and the hydrogen reacts with the sulfur compounds to remove the sulfur as $H_2S$. This produces a vapor effluent comprising an olefin-containing, sulfur-reduced naphtha, $H_2S$, unreacted hydrogen and any treat gas diluents. That in this embodiment the naphtha is all vapor in the reactor, means that the CO level is less, on a combined vapor basis, than what is in the treat gas entering the reactor via line 24. The desulfurized naphtha contains less than about half the amount of sulfur that would have remained with 70 vppm CO in the treat gas and less than a third of what it would have been if the treat gas contained 100 vppm CO, with no significant reduction in olefin content. The reactor effluent passes to separation unit 12 via line 26. In 26 the vapor is cooled to condense the naphtha, which is then separated from the remaining gas. The naphtha is stripped to remove dissolved gasses, including $H_2S$ and $CO_X$, and then sent to storage via line 28. The gas separated from the naphtha is scrubbed with amine to remove $H_2S$, with the remaining hydrogen-rich gas recycled back into the reactor via lines 22 and 24. In this embodiment, if olefin saturation is of no concern or if the naphtha feed does not contain olefins, less $CO_X$ removal from the make-up gas may be required, because the hydrodesulfurization reaction can be run at more severe conditions for sulfur removal, without concern for the olefin hydrogenation that occurs at severe conditions. Nevertheless, even at severe conditions, reducing the $CO_X$ content of the treat gas will increase sulfur removal from the naphtha. It is preferred in the practice of the invention, that the $CO_X$ is removed from the fresh or make-up treat gas.

Turning now to FIG. 2, a typical prior art hydrodesulfurization process is seen as similar to that of FIG. 1 in all respects, except for the $CO_X$ removal unit. Thus, FIG. 2 shows a single stage hydrodesulfurization process as comprising a hydrodesulfurization reactor 10 and a separation unit 12. Reactor 12 contains at least one fixed bed of hydrodesulfurization catalyst (not shown). The same naphtha feed containing both organic sulfur compounds and olefins used in the FIG. 1 process is passed into the reactor for this prior art process. As is the case for the FIG. 1 process of the invention, in this prior art process it is desired to maximize sulfur removal while preserving olefins. Fresh hydrogen treat gas, which serves as make-up hydrogen and which contains from about 10-20 vppm CO, is passed into the hydrodesulfurization reactor 12 via lines 18 and 24. At the same time, recycle hydrogen treat gas from line 22 also passes into the reactor 12 via line 24. This recycle hydrogen treat gas contains from about 50-200 vppm of CO. As a consequence, the CO content of the combined fresh and recycle hydrogen treat gas streams entering reactor 12 via line 22 is about 40-180 vppm. Those skilled in the art will know that although the fresh or make-up hydrogen contains only 10-20 vppm CO, the recycle operation of the reactor results in CO build-up which, without CO or $CO_X$ removal, at process equilibrium will be about 50-200 vppm in the recycle gas. As a consequence, under the same reaction conditions used in the FIG. 1 process, the sulfur content of the desulfurized naphtha in line 26 without the $CO_X$ removal will be more than twice and three times as great than that achieved with the $CO_X$ removal, according to the practice of the invention.

FIGS. 3 and 4 represent additional embodiments of the invention. As is the case for the FIG. 1 process, FIGS. 3 and 4 also embody single stage processes for selectively hydrodesulfurizing an olefin and sulfur-containing naphtha. A is the case for the FIG. 1 process, the processes in FIGS. 3 and 4 both comprise a single stage hydrodesulfurization reactor 11, a separation unit 12, a naphtha feed line 16, a fresh or make-up hydrogen treat gas line 18, recycle treat gas line 22, etc. In FIG. 3, the $CO_X$ removal unit 14 is also a simple methanater reactor, except that both the make-up and recycle hydrogen pass through it to remove $CO_X$ from both the make-up hydrogen and the recycle hydrogen. This permits the use of fresh hydrogen that contains substantially more than 10-20 vppm and also insures that the treat gas fed into the hydrodesulfurization reactor 10 contains little, if any, $CO_X$, for deep selective naphtha desulfurization with minimal olefin loss. The embodiment of FIG. 4 is similar to that of FIG. 3, except that instead of a methanater reactor for $CO_X$ removal, a sequential combination of a water gas shift reactor 30 and an amine scrubber are used. In this embodiment, in the water gas shift reactor the CO is converted to $CO_2$ which is then removed from the treat gas in the amine scrubber 34.

The invention will be further understood with reference to the illustrative examples below.

EXAMPLES

In the examples below, the naphtha feeds were intermediate (ICN) and heavy (HCN) FCC cat naphthas, which contained sulfur compounds and olefins. The HCN was used for start-up and final activity check. A low metal loaded Co/Mo on alumina catalyst containing 4.5 wt. % $MoO_3$ and 1.2 wt. % CoO in 1.3 mm ASQ form and a commercial Co/Mo catalyst containing 4.0 wt. % CoO and 15.0 wt. % $MoO_3$ on alumina were used. The low metal loaded catalyst is known to be highly selective for removing sulfur from an olefin and sulfur-containing naphtha. Each catalyst was loaded into a separate, fixed bed, isothermal downflow, pilot plant tubular reactor and activated in-situ in the reactor. Catalyst activation was achieved using a 10 mole % $H_2S/H_2$ gas blend in a virgin naphtha, for approximately 14 hours at two holding temperatures, 400° F. (gas/liquid mixed phase) and 650° F. (all vapor phase), and with a reactor pressure of 300 psig. The reactor was then cooled to 200° F., before the introduction of the naphtha feed to be desulfurized. In the results and in FIGS. 5-7, the CO concentration is that in the combined hydrogen and naphtha vapor feed entering the reactor. In both of the examples, the naphtha passed into the reactor was in the vapor state.

Example 1

Figure 5:
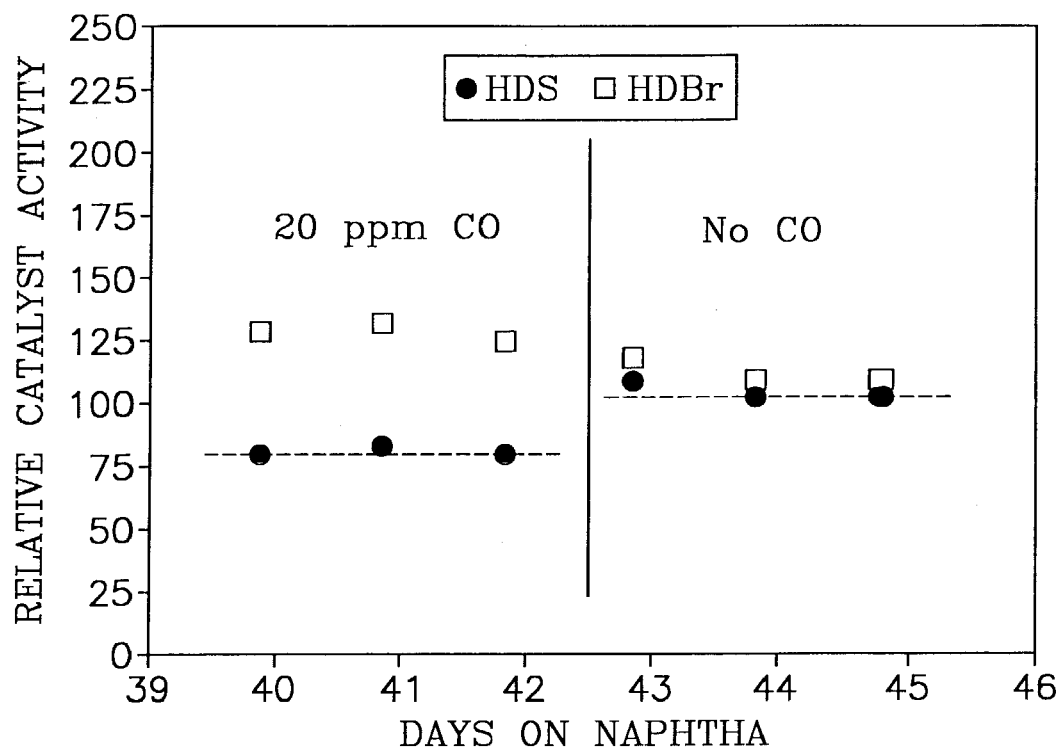
FIG. 5 is a graph showing the effect of a low amount of CO in suppressing activity for naphtha hydrodesulfurization and olefin saturation.
Figure 6:
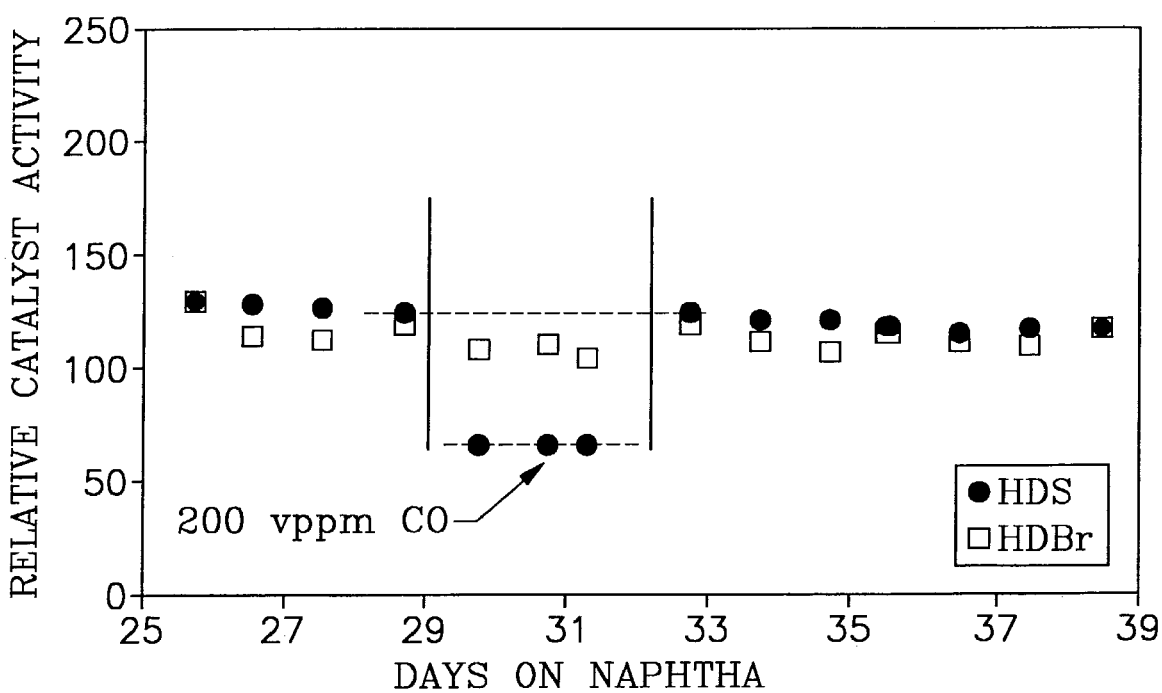
FIG. 6 graphically illustrates the effect of higher CO concentrations on hydrodesulfurization and olefin saturation activity.

The purpose of this experiment was to determine the effect that CO in the treat gas had on both the HDS and HDBr activity of the naphtha hydrodesulfurization catalyst. By HDBr is meant olefin saturation (hydrogenation) activity, as measured by bromine number. The low metal loaded Co/Mo on alumina catalyst containing 4.5 wt. % $MoO_3$ and 1.2 wt. % CoO in 1.3 mm ASQ form was used. The feed was an intermediate cat naphtha (ICN) having 1941 wppm total sulfur and a bromine number of 38. Test conditions included a temperature of 525° F., a total inlet pressure of 290 psig and a treat gas rate of 2000 SCF/B. The treat gas was 75 vol. % hydrogen, with the balance methane. The reactor was run with the ICN having 20 vppm CO in the treat gas, no CO in the treat gas and with 200 ppm CO in the treat gas. The results are shown in FIGS. 5 and 6.

For the first run, the reactor had been running with 20 vppm CO in the treat gas. After 42 days, the CO was removed from the gas. The results are shown in FIG. 5. The effect of the 20 vppm treat gas CO on the HDS and HDBr activity of the catalyst is immediately apparent. The presence of the CO in the treat gas had significantly lowered the HDS activity. However, when the CO was removed from the treat gas, about a 20% increase in the HDS activity of the catalyst was observed. The presence of the CO had a much smaller effect on the HDBr activity.

In the second run, the reactor was run on-stream for 29 days, when 200 vppm of CO was added to the treat gas. This resulted in about a 45% loss of HDS activity, as shown in FIG. 6. As was the case for the first run, the CO had little effect on the HDBr (i.e., olefin saturation) activity. After the 200 vppm of CO was removed from the gas, substantially full restoration of the HDS activity of the catalyst was observed. This restoration is shown for days 32-39 in FIG. 6.

Example 2

Figure 7:
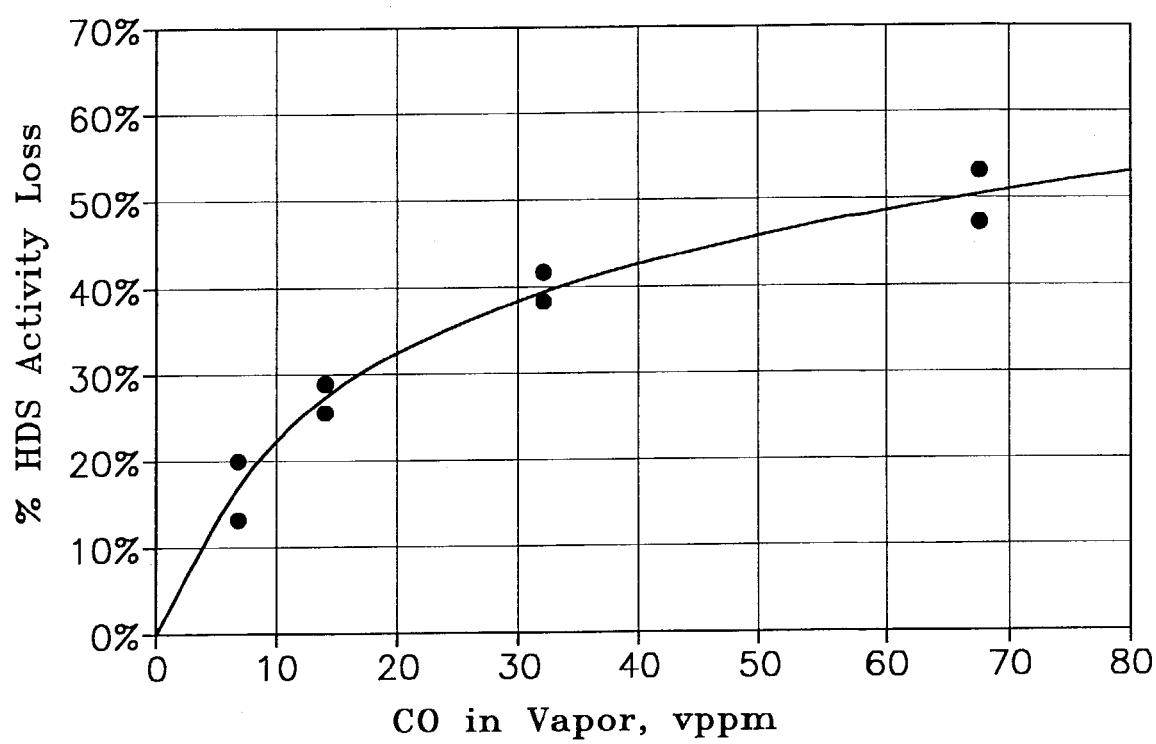
FIG. 7 is a graph showing the effect of CO concentration on hydrodesulfurizing activity.

In this experiment, the ICN was a 140° F.+ cut which contained 1556 wppm sulfur and had a Bromine Number of 69. Both the low metal loaded Co/Mo on alumina catalyst containing 4.5 wt. % $MoO_3$ and 1.2 wt. % CoO in 1.3 mm ASQ form and the commercial Co/Mo catalyst containing 4.0 wt. % CoO and 15.0 wt. % $MoO_3$ on alumina were used. These catalysts were loaded into two separate reactors that were run simultaneously on the same feed and treat gas source. The reaction conditions included a temperature of 525° F., a pressure of 230 psig, a treat gas ratio of pure (except for the CO content) hydrogen at 2000 SCF/B, a naphtha LHSV feed rate of 7 for the higher Co/Mo loaded catalyst and 4 for the lower Co/Mo loaded catalyst. These feed rates were set to achieve about 95% desulfurization with the 100% hydrogen treat gas. The effect of the CO on each catalyst was essentially the same. The deactivation results experienced with both catalysts were about the same. Therefore, they were combined to produce the data points shown in the FIG. 7 graph. Turning to FIG. 7, the effect of very low CO concentration on the HDS activity debit, for selective naphtha hydrodesulfurization, is immediately apparent. FIG. 7 shows that, even at a low CO concentration of 15 vppm in the combined naphtha vapor and treat gas, a 29% reduction in catalyst activity is experienced compared to no CO. However, at 4 vppm CO the activity debit is only 10% and at 2 vppm it is only about 5%.

The Table below shows the CO concentration in the vapor (treat gas plus naphtha) at three CO levels, along with the desulfurized product naphtha sulfur level and bromine number at each level. The desulfurized naphtha product sulfur level and bromine number at each level was averaged from both catalysts. Referring to the Table, the effect of very low concentrations of CO on product sulfur for selective naphtha desulfurization is immediately apparent. As the CO concentration in the treat gas is lowered, the effect on product sulfur level is substantial. For example, at approximately 67 vppm CO in the treat gas, the sulfur in the product naphtha was 286 wppm, whereas at a CO concentration of 6.6 vppm the desulfurized naphtha product had only 105 wppm. This represents an almost threefold reduction in product sulfur. The effect on olefin content (as measured by bromine number) in the product was small. Over the 6.6-67.1 vppm CO concentration there was very little change in product bromine number. The net effect on overall catalyst selectivity (desulfurization as a function of olefin saturation) is that as the CO level in the treat gas was reduced, selectivity increased significantly.

Effect of Low CO Levels on Desulfurized Naphtha Sulfur and Bromine Number

| CO in Vapor, vppm | 67.1 | 31.6 | 6.6 |
| --- | --- | --- | --- |
| Wppm Sulfur | 286 | 196 | 105 |
| Bromine Number | 51.9 | 53.6 | 50.5 |

What is claimed is:

1. A process for hydrodesulfurizing a sulfur-containing naphtha comprising reacting said naphtha with a once-through hydrogen treat gas, in the presence of a catalytically effective amount of a hydrodesulfurization catalyst, in a hydrodesulfurization reaction zone having $CO_X$ present, an amount of $CO_X$ present being defined as an amount of CO present plus one half of an amount of $CO_2$ present, in which the amount of $CO_X$ present, based on a combined total of $CO_X$ present in the hydrogen treat gas and $CO_X$ present in the naphtha feed in a vapor state, is maintained at less than about 100 vppm.

2. A process according to claim 1 wherein $CO_X$ is maintained at less than about 30 vppm in said reaction zone.

3. A process according to claim 2 wherein said catalyst is a sulfided catalyst and contains a catalytic component of either or both a Group VIB metal and a Group VIII non-noble metal.

4. A process according to claim 1 wherein all or a portion of said treat gas contains $CO_X$ and wherein said $CO_X$ content of said gas is reduced by replacing at least a portion of said gas with a hydrogen-containing gas that contains less $CO_X$.

5. A process according to claim 1 wherein all or a portion of said hydrogen treat gas contains $CO_X$ and wherein said $CO_X$ is maintained at less than about 30 vppm in said zone by removing $CO_X$ from all or a portion of said treat gas before it reacts with said naphtha.

6. A process according to claim 5 wherein said $CO_X$ is maintained at a level of less than about 15 vppm in said reaction zone.

7. A process according to claim 6 wherein said $CO_X$ is maintained in a range of about 0 to about 5 vppm in said reaction zone.

8. A process according to claim 7 wherein said $CO_X$ level in said reaction zone is maintained by removing $CO_X$ from fresh treat gas before it enters said zone.

9. A process according to claim 5 wherein said $CO_X$ level in said reaction zone is maintained by removing $CO_X$ from fresh treat gas before it enters said zone.

10. A selective naphtha hydrodesulfurization process comprising hydrodesulfurizing an olefin and sulfur-containing naphtha feed in a hydrodesulfurization reaction zone having $CO_X$ present, an amount of $CO_X$ present being defined as an amount of CO present plus one half of an amount of $CO_2$ present, in which a hydrogen-containing treat gas reacts with the naphtha under catalytic selective hydrodesulfurization conditions including a pressure of less than about 1000 psig, in the presence of a catalytically effective amount of a sulfided, low metal loaded hydrodesulfurization catalyst, where the amount of $CO_X$ present in the reaction zone, based on a combined total of $CO_X$ present in the hydrogen treat gas and $CO_X$ present in the naphtha feed in a vapor state, is maintained at less than about 100 vppm.

11. A process according to claim 10 wherein said catalyst comprises a support component and at least one catalytic component of a metal of either or both Group VIB and a Group VIII non-noble metal, and wherein the amount of said catalytic metal components, calculated as their oxides and based on the total catalyst weight, is less tan about 12 wt. %.

12. A process according to claim 11 wherein said $CO_X$ level in said zone is maintained at less than about 30 vppm.

13. A process according to claim 12 wherein said catalyst comprises catalytic components of CoO and $MoO_3$ and wherein the Co/Mo atomic ratio ranges from 0.1 to 1.0.

14. A process according to claim 13 wherein said desulfurized naphtha has an octane number within five octane numbers of said naphtha passed into said reaction zone.

15. A process according to claim 14 wherein said $CO_X$ is maintained at a level of less than about 15 vppm in said reaction zone.

16. A process according to claim 15 wherein all or a portion of said treat gas contains $CO_X$ and wherein said $CO_X$ content of said gas is reduced by replacing at least a portion of said gas with a hydrogen-containing gas that contains less $CO_x$.

17. A process according to claim 10 wherein said $CO_X$ level in said reaction zone is maintained by removing $CO_X$ from said fresh treat gas before it enters said zone.

18. A process according to claim 17 wherein said $CO_X$ is maintained at a level of less than about 5 vppm in said reaction zone.

19. The process of claim 10 further comprising separating from the process a naphtha product, the naphtha product having a lower sulfur content than the naphtha feed.

20. The process of claim 19 further comprising separating $H_2S$ from the process.

21. A process for selectively hydrodesulfurizing a sulfur-containing naphtha comprising reacting said naphtha with a $CO_X$-containing hydrogen treat gas, an amount of $CO_X$ being defined as the amount of CO present plus one half of the amount of $CO_2$ present, under catalytic selective hydrodesulfurization conditions including a pressure of less than about 1000 psig, in the presence of a catalytically effective amount of a hydrodesulfurization catalyst, in a hydrodesulfurization reaction zone in which the amount of $CO_X$ present, based on a combined total of $CO_X$ present in the hydrogen treat gas and $CO_X$ present in the naphtha feed in a vapor state, is maintained at less than about 100 vppm.

22. The process of claim 10, wherein the selective hydrodesulfurization conditions include a pressure from about 75-600 psig.

23. The process of claim 21, wherein the selective hydrodesulfurization conditions include a pressure from about 75-600 psig.

* * * * *